May 20, 1941.　　　J. A. EDEN ET AL　　　2,242,293
SCREW TAPPING MACHINE
Filed July 5, 1940　　　6 Sheets-Sheet 1

| Travel of Tap in Inches | Pitch of Thread | | | | | | | | | |
|---|---|---|---|---|---|---|---|---|---|---|
| | 26 | 24 | 22 | 20 | 18 | 16 | 14 | 13 | 12 | 11 |
| 1/2 | 20 | 18 | 17 | 15 | 14 | 12 | 11 | 10 | 9 | 8 |
| 3/4 | 29 | 27 | 25 | 23 | 20 | 18 | 16 | 15 | 14 | 12 |
| 1 | 39 | 36 | 33 | 30 | 27 | 24 | 21 | 20 | 18 | 17 |
| 1 1/4 | 48 | 45 | 42 | 38 | 34 | 30 | 26 | 24 | 23 | 21 |
| 1 1/2 | 59 | 54 | 50 | 45 | 41 | 36 | 32 | 29 | 27 | 25 |
| 1 3/4 | 68 | 63 | 58 | 53 | 47 | 42 | 37 | 34 | 32 | 29 |
| 2 | 78 | 72 | 66 | 60 | 54 | 48 | 42 | 39 | 36 | 33 |

Fig. 3.

INVENTORS
JAMES A. EDEN.
HARRY PHILLIPS.
BY Benj. T. Rauber ATTORNEY

May 20, 1941.  J. A. EDEN ET AL  2,242,293
SCREW TAPPING MACHINE
Filed July 5, 1940   6 Sheets-Sheet 3

Fig. 6.

INVENTORS
JAMES A. EDEN.
HARRY PHILLIPS.
BY
Benj. T. Pauber ATTORNEY

May 20, 1941.  J. A. EDEN ET AL  2,242,293
SCREW TAPPING MACHINE
Filed July 5, 1940   6 Sheets-Sheet 4

INVENTORS
JAMES A. EDEN.
HARRY PHILLIPS.
BY Benj. T. Rauber ATTORNEY

INVENTORS
JAMES A. EDEN.
HARRY PHILLIPS.
BY
Benj. T. Rauber ATTORNEY

May 20, 1941.     J. A. EDEN ET AL     2,242,293
SCREW TAPPING MACHINE
Filed July 5, 1940     6 Sheets-Sheet 6

INVENTORS
JAMES A. EDEN.
HARRY PHILLIPS.
BY Benj. T. Pauber ATTORNEY

Patented May 20, 1941

2,242,293

UNITED STATES PATENT OFFICE 2,242,293

SCREW TAPPING MACHINE

James A. Eden and Harry Phillips, Springfield, Mass., assignors to Baush Machine Tool Company, Springfield, Mass., a corporation of Massachusetts Application July 5, 1940, Serial No. 344,102

20 Claims. (Cl. 10—129)

Our invention relates to a machine for tapping screw threads in bores or openings, and more particularly to a tapping machine of the above type in which the threads may be cut or tapped with great accuracy and to a predetermined depth or number of threads.

In certain mechanisms as, for example, in aircraft and aircraft engines, bores or openings must be tapped with sufficient accuracy so that when a threaded shank is screwed into the openings it will have no play, or substantially no play, in the threads of the opening. It is also necessary that the depth of the threads be accurately controlled, the tolerance of about one and one-half turns over the threads required for the nut or screw being generally the maximum permitted.

To attain this accuracy it has generally been necessary to tap the bores or openings by hand, and great skill has been required to set and turn the tap in the bore or opening without exerting such pressure as would enlarge the cut in any way and thus give too loose a fit.

In our present invention we provide a machine whereby bores or openings may be tapped with an accuracy excelling that obtained by the best skilled hand work and in which the depth of the tapping may be accurately controlled.

Our invention also provides mechanism whereby the tap may be quickly and easily placed in position on a work piece and in which taps of different pitch and size may be quickly and easily mounted in the mechanism. The mechanism also provides means guarding against any possible injury to the work piece or to the mechanism, in case of failure of the operator to position the tap, or due to any other error in setting the mechanism in operation.

In our invention a tap of selected size and pitch is carried in a freely floating head which may be easily moved to position to place the tap immediately above a bore to be tapped. The tap is then rotated and fed into the bore at a rate corresponding to the pitch of the tap.

During the rotation and feed of the tap into the bore, the head supporting the tap is freely floating. This permits a play at the upper end of the spindle holding the tap, and of the tap itself, so that the tap is free to follow the threads being cut rather than being forced into a rigid position which might enlarge a thread, or certain of the threads, by the travel of the tap.

A control mechanism is also provided, preferably in the head, which may be set to give the tap-rotating spindle a predetermined number of rotations so as to cut a predetermined number of threads, or to tap the bore or opening to a predetermined depth.

This mechanism comprises a counting device or differential mechanism, one part of which may be rotated independently to the position indicated on an indicating dial and set. As the spindle rotates, and when it reaches a position corresponding to that set, a reversing switch is operated to reverse the rotation of the spindle and tap to withdraw them from the threads cut in the bore or opening.

To prevent breakage or injury to the tap or to the work piece or to the mechanism, the tap-holding mechanism is so mounted that in the event that it is not properly set in the opening or bore and cannot, therefore, be fed into it, the feeding mechanism is displaced under a spring pressure and the tap is not forced by the lead screw or feeding mechanism.

An emergency reversing switch is also provided in case it is desirable or necessary to reverse the tap before it has proceeded to a depth set by the counting mechanism.

The various features of the invention are illustrated by way of example in the accompanying drawings in which.

In the embodiment of the invention shown in the accompanying drawings, the mechanism is mounted on a base 20 having an upright part 21 provided at one side with guides 22 for a vertically movable work table 23 on which work pieces to be tapped may be placed and secured. The work table 23 may be raised and lowered by any suitable or standard mechanism actuated by crank 24.

Figures 4, 5:
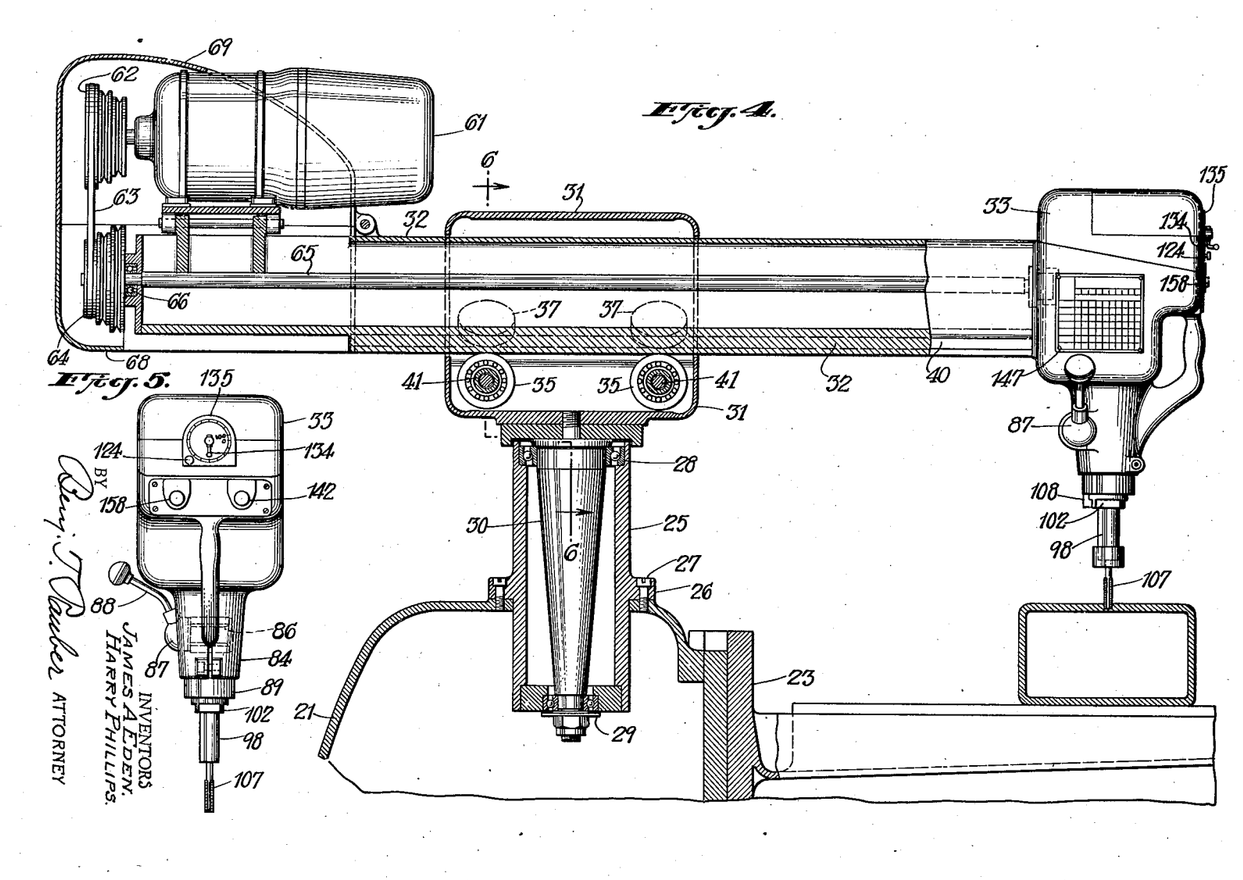
Fig. 4 is a vertical elevation partly in section and on a larger scale of the upper part of the mechanism shown in Fig. 1.
Fig. 5 is an end view of a head of the mechanism in Fig. 4.
Figure 6:
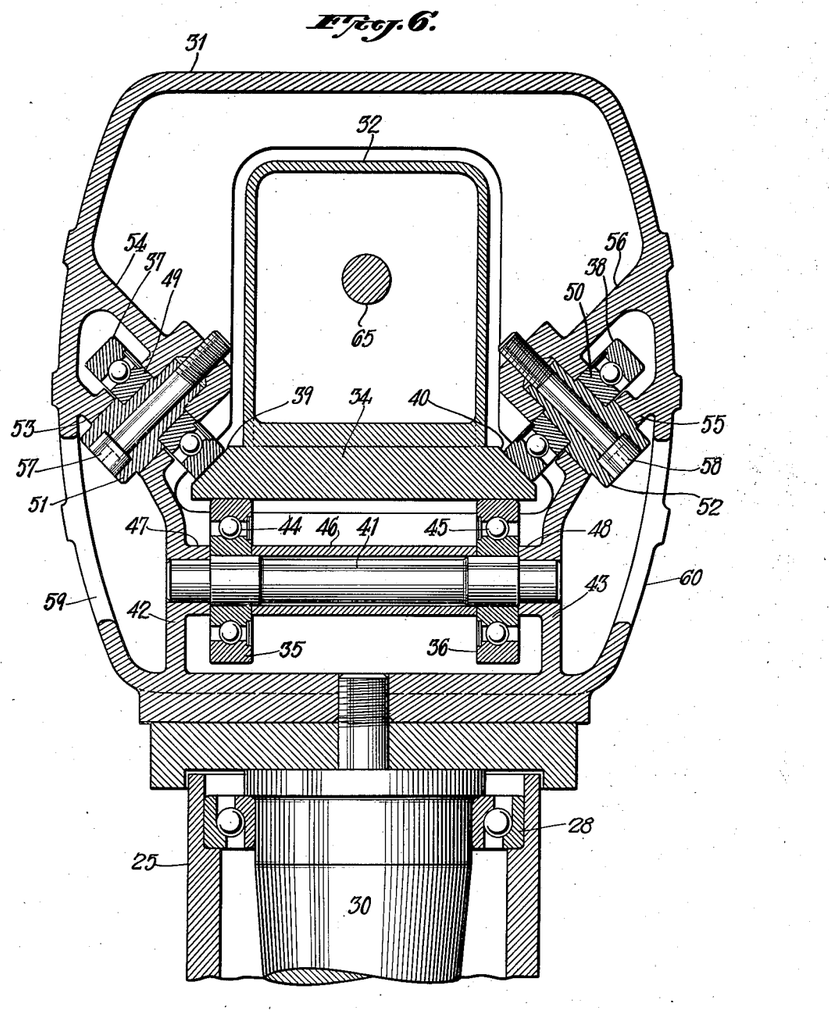
Fig. 6 is a vertical section taken on line 6—6 of Fig. 4.

As shown more particularly in Figs. 4 and 6, a hollow supporting cylinder or standard 25 is mounted on the upper end of the upright 21 by means of a flange 26 and bolts 27 and is provided at its upper and lower ends with bearings 28 and 29 respectively, which may be of any suitable type, preferably thrust ball bearings as shown in Fig. 4. A vertical shaft 30 is rotatably supported in the bearings 28 and 29 and carries a carriage 31 above the upper end or edge of the standard 25. The carriage 31 is, therefore, freely rotatable on the vertical axis of the shaft 30.

Slidably mounted in the carriage 31 is a horizontal hollow arm 32 extending through the carriage and carrying a spindle supporting head 33. The arm 32 is slidably mounted in the carriage 31 so that its radial distance from the axis of the shaft 30 may be adjusted or varied, and it swings with the carriage throughout any desired angle or throughout a full revolution. The head 33 may, therefore, be brought to any position within the sweep of the arm 32 by merely sliding it to the desired radial and angular position.

The arm 32 is mounted so as to be firmly held in the carriage and slidable with a minimum of friction by means of two sets of rollers connected on a base plate 34 of the arm 32 on opposite sides of the shaft 30. Each set comprises a pair of lower rollers 35 and 36 supporting the arm near its side edges, and a pair of upper rollers 37 and 38 bearing against bevel side edges 39 and 40 of the base plate 34.

The rollers 35 and 36 are supported on a horizontal shaft 41 mounted at its ends in vertical walls 42 and 43 and freely rotatable on the shaft 41 by means of ball bearings 44 and 45 which are spaced at suitable intervals by means of a spacing sleeve 46. The bearings 44 and 45, and the rollers 35 and 36, are accurately held in fixed position on the shaft 41 between the sleeve 46 and inward extensions 47 and 48 on the walls 42 and 43.

The walls 42 and 43 extend upwardly and outwardly to join with the outer wall of the carriage 31, and in the outwardly inclined part are mounted anti-frictional ball bearings 49 and 50 for the rollers 37 and 38.

The inner hubs or raceways of the roller bearings 49 and 50 are mounted on supporting axles 51 and 52 mounted in spaced branches 53 and 54, 55 and 56, respectively, of the walls 42 and 43. The axles 51 and 52 are secured in place by means of bolts 57 and 58 having their heads inset into their respective axles and having ends threaded into the walls 54 and 56 respectively.

The outer wall of the carriage is provided with suitable openings 59 and 60 to give access to the heads of the screws 57 and 58 so that they may be loosened and tightened to hold the axles in any desired axial position.

The part of the axle carrying the ball bearing raceways 49 and 50 is mounted eccentrically of the axles so by rotating the axles the rollers may be tightened against the inclined surfaces 39 and 40 so as to take up any play that may be caused by wearing of the plate 34 or of the rollers.

Through the above mounting, the arm 32 is slidable in the carriage with a minimum friction as well as being rotatable freely about the axis of the shaft 30.

At the opposite end of the arm 32, from that supporting the head 33, there is mounted a reversible brake motor 61 for driving the tap and provided with a pulley or set of pulleys 62 of graded or different diameters. The pulley 62 is connected through a belt 63 to drive a corresponding pulley or group of pulleys 64 mounted on the free end of a shaft 65 extending lengthwise through the arm 32 and mounted in suitable bearings 66 and 67, Figs. 4 and 7, at opposite ends of the arm 32. A housing 68 is provided on the end of the arm 32 for the pulleys 62 and 64 and has a hinged cover 69 which may be raised to permit the belt 63 to be shifted to control the speed of the shaft 65. To change the speed of the shaft 65 the motor 61 may be lowered to release the tension of the belt 63. The belt may then be shifted and the motor lifted to tension the belt. At its opposite end the shaft 65 extends through the bearing 67 and into the head 33. On the projecting end of the shaft 65 is mounted a bevel gear 70 which meshes with a bevel gear 71 having a hollow shaft 72 extending downwardly to and through a lower antifriction or ball-bearing 73. The bearing 73 supports the shaft 72 and gear 71 and is in turn mounted in the upper end of a hollow boss 74 extending upwardly from the bottom of the head.

The shaft 72 is extended above the gear 71 by an extension 75 which is journalled in a bearing 76 mounted in a bracket 77 extending horizontally above the gear 71 and then vertically in a wall 78. The motor 61 acting through the pulleys 62 and 64, belt 63, shaft 65 and gear 70 serves to drive the gear 71 and the vertical hollow shaft 72, which in turn drives the tap. For this purpose the lower end of the shaft 72 is bored to receive the upper part of a shaft 79 which is slidably splined in the lower part 80 of the shaft 72. The gear 71 thus rotates the shaft 79 which is, however, free to move or slide upwardly and downwardly during rotation.

The shaft 79 extends downwardly below the lower end of the shaft 72 and immediately, or shortly below, the end of the shaft 72 is mounted in the inner raceway 81 of a roller bearing 82, the outer raceway of which is formed in a vertical sleeve or quill 83 that is moved upwardly and downwardly in a hollow depending sleeve or boss 84.

A number of teeth 85 are provided at one side of the quill 83 which mesh with a pinion 86 in the boss 84, which in turn is pinned to the link 87 of crank 88, Figs. 4 and 5.

It will be apparent that by rotating the crank 88 and the pinion 86, the quill 83 may be raised and lowered. For example, it may be lowered from the position shown in Fig. 7 by rotating the pinion 86 in a clockwise direction. The upper movement of the quill is limited by a ring or flange 89 at its lower end which may abut the lower end of the boss 84 when the quill 83 is raised to its upper limit. The quill may be kept from turning by longitudinal keyways 90, matching and slidably keyed to keyways 91 in the depending boss 84, or by any other suitable retaining means.

The shaft 79 is rotatable within the quill 83 but is held in fixed longitudinal position relative thereto by means of a pin 92 extending through the shaft and through the inner raceway 81 of the bearing 82. This bearing is in turn fixed in position relative to the quill 83 between a lower bearing plate 93 supported on a shoulder 94 in the quill, and an upper plate 95 fixed on the upper face of the bearing 82 by means of a ring 96 threaded into the upper end of the quill.

It will be apparent that the bearing is thus fixed in position on the quill. As the quill is raised and lowered, the shaft 79 moves with it sliding upwardly and downwardly in the lower end of the hollow shaft 72.

Below the bearing 81 the shaft 79 extends downwardly into a closely fitting cylindrical recess 97 of a lead screw spindle 98. The lead screw spindle 98 is splined to the shaft 79 by a spline 99 whereby it rotates with, or is rotated by, the shaft 79 but is slidable vertically thereon. The outer surface of the lead screw spindle 98 is provided with screw threads 100 in the upper part of the spindle corresponding to the pitch of the tap with which the spindle is to be used. These screw threads mesh or thread with internal screw threads of a sleeve 101 fixed in the lower end of the quill 83 by means of a nut 102 which is threaded into the lower end of the quill 83 and acts as a lower stop for the lower end of the sleeve 101. The sleeve 101 is slidable in the quill 83 and is kept from rotation by a suitable slidable spline 103. The sleeve or collar 101 is, however, resiliently held downwardly onto the nut 102 by means of a spring 104 confined between a shoulder 105 on the collar and the bottom of a thrust ball bearing 106, the upper part of which is secured at the upper end of the lead screw spindle 98.

Through this arrangement, when the shaft 79 and the lead screw spindle 98 are rotated in such a direction as to feed the spindle 98 downwardly, they compress the spring 104 and hold the collar 101 the more tightly or firmly against the nut 102. However, if the spindle 98 should rest upon a flat surface instead of being fitted to a bore or opening and thus be unable to move downwardly, the threading of the spindle into the collar 101 would thereupon merely lift the collar 101 compressing the spring 104 and thus prevent breakage of any part of the mechanism, or injury to the work piece.

Normally, however, when a tap 107 is mounted in the lower end of the spindle 98, Figs. 4 and 5, and is positioned to enter an opening or bore to be tapped, the rotation of the shaft 79 causes the spindle 98 to be rotated and to be fed downwardly to correspond to the pitch of the tap through the screw threads 100 on the spindle rotating in the screw threads on the inner surface of the collar 101. In this manner the tap is set in proper vertical position to enter the bore and is rotated and fed downwardly to correspond to the pitch of the tap but without exerting a greater pressure downwardly than the force of the spring 104 and with the upward end of the tap and of its feed spindle, and the driving shaft in a floating condition so that the upper part of the tap may vibrate as it is rotated.

The vibration is very slight, but if the upper end of the tap were held rigidly, its vibration would take effect or react at the thread cutting edges and tend to enlarge or gouge the threads being cut, and to that extent provide a play between the tapped opening and the screw which it is to fit. The floating support for the tap spindle, therefore, enables this defect of machine tapped openings to be overcome and enables a tapped opening to be cut to a fit conforming accurately to the tap.

For each tap a separate lead spindle and collar are provided so that the advance of the spindle is always in accordance with the pitch of the tap. The lead spindle and collar assembly may be removed and replaced as a unit by unscrewing the nut 102 whereupon the collar 101 may be slipped out together with the spring 104, the ball bearing 106, and the spindle 98 and placed in a proper drawer in the table 23. Accidental loosening while removing the nut 102 may be prevented by a locking member 108.

In tapping a bore or opening, the quill 83 is lowered and with it the spindle 98 until the tap 107 reaches the upper edge of the bore to be tapped, thereupon the motor 61 is started and the tap rotated and advanced into the bore. The distance of its travel into the bore will depend upon the pitch of the tap and the number of rotations given to it.

To enable the tap to be advanced automatically to a predetermined depth and then withdrawn, our invention provides a means whereby the number of rotations from the start of the tap may be counted and a mechanism set to stop and reverse the spindle after a predetermined number of rotations. This counting and control device may be of any suitable construction. That shown in Figs. 10 to 15 inclusive is, however, preferred.

Figures 7, 8, 9:
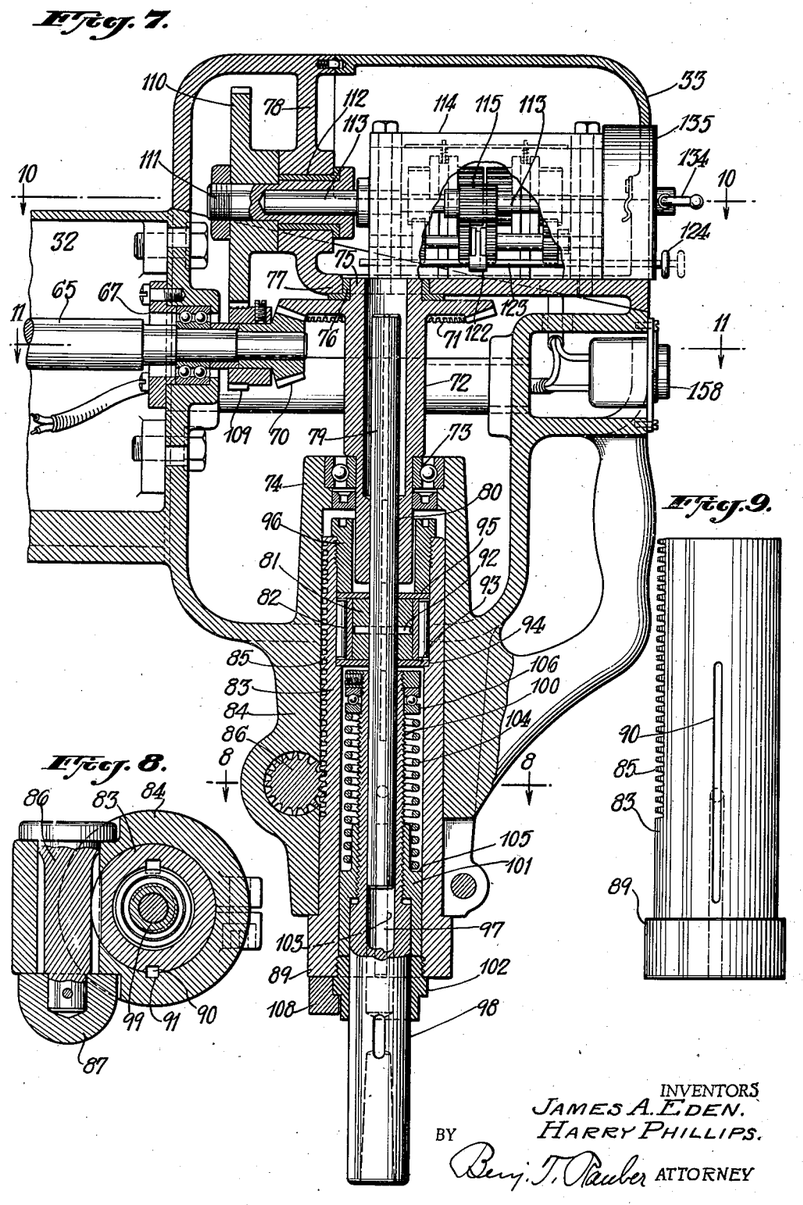
Fig. 7 is a vertical section through the head of the machine taken on a plane parallel to that of Fig. 4.
Fig. 8 is a section taken on line 8—8 of Fig. 7.
Fig. 9 is a side view of a spindle mounting quill of the head.

In this arrangement, a pinion 109, Fig. 7, is mounted on the end of the shaft 65 projecting into the head 33 as, for example, by being mounted onto an extended hub of the gear 70. The gear or pinion 109 meshes with and drives a gear 110 mounted on and rotating with a shaft 111 extending through a bearing 112 in the vertical bracket wall 78. The shaft 111 has a recess in the end and projecting through the vertical extension 78, and in this recess is received and keyed a shaft 113 of the counting and reversing mechanism 114. The shaft 113 is thus rotated with the rotation of the spindle 98 and in a direct proportion or relation therewith to drive the counting and reversing mechanism.

The shaft 113 extends longitudinally within the casing of control mechanism 114, and about midway thereof there is fixedly mounted a wide pinion 115 which meshes at all times with a pinion 116 fixed on a shaft 117, one end of which is journalled in the end wall 118 of the mechanism, and the other end of which is reduced and received and journalled in a recess 118' of an aligned shaft 119, the other end of which is journalled in the opposite end 120 of the reversing mechanism. On the shaft 119 is slidably mounted or splined a pinion 121 which may be slid on the shaft 119, either free of the pinion 115 or meshed with it so as to be driven at the same speed as the pinion 116. The pinion 121 is normally held in mesh with the pinion 115 but may be slid free of it by a shifting fork 122 on a sliding rod 123 which extends through the end wall 120 and is provided at its projecting end with a knob 124. When the knob is grasped and pulled, the gear 121 is out of mesh with the gear 115 and the gear 121 and the shaft 119 may be rotated without rotating the shaft 113. This is done when it is desired to set the mechanism to rotate through a definite period of rotation and then to actuate a reversing switch to reverse the rotation of the driving motor.

For this purpose the gear 121 meshes in all positions on the shaft 119 with a long pinion 125 rotatably mounted on a shaft 126 extending inwardly from the wall 118 and having a reduced end extending into a recess of an independently rotatable shaft 127. There is also fixed on the shaft 119 a second pinion 128 which meshes with a pinion 129 on the shaft 127. It will, therefore, be apparent that when the shaft 127 is rotated it rotates the pinion 129 and the pinion 128 and also rotates the pinion 121 and the pinion 125. This pinion, or gear drive, however, is so proportioned that the pinion 125 rotates at a slightly different speed from the pinion 129. This may be conveniently done by giving one of the pinions 129 or 125 one less tooth than the other as, for example, by giving the pinion 129 twenty-nine teeth, and the pinion 125 thirty teeth.

The pinion 129 has a flange 130 at the end nearest the pinion 125 and similarly the pinion 125 has a flange 131 facing the flange 130 and slightly spaced therefrom. Each of these flanges is provided with a notch 132 and 133 respectively and at their peripheral edges. The shaft 127 is connected with a crank 134 on the outside of the head 33 whereby it may be rotated. This rotation is indicated on a dial 135, Fig. 3, which is driven from the crank 134 and shaft 127 through a speed reducing mechanism.

When the knob 124 is pulled out, therefore, to disconnect the pinion 121 from the driving pinion 115, and the crank 134 rotated to rotate the shaft 127, the flanges 130 and 131 will be rotated at different speeds so that the notches 132 and 133 will gradually move relatively to each other out of alignment. When the knob 124 is released and the pinion 121 moved to mesh with the pinion 115 on the drive shaft 113, and the motor 61 started to rotate the lead screw spindle and tap forwardly, the gears 125 and 129 are rotated in the reverse direction by the pinion 115. This rotation continues until the notches 132 and 133 come into alignment.

Figure 10:
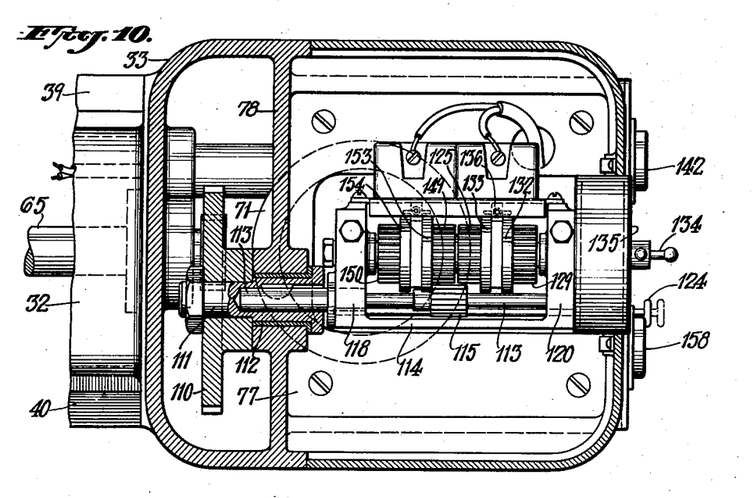
Figs. 10 and 11 are horizontal sections taken on the lines 10—10 and 11—11 of Fig. 7, respectively.
Figure 11:
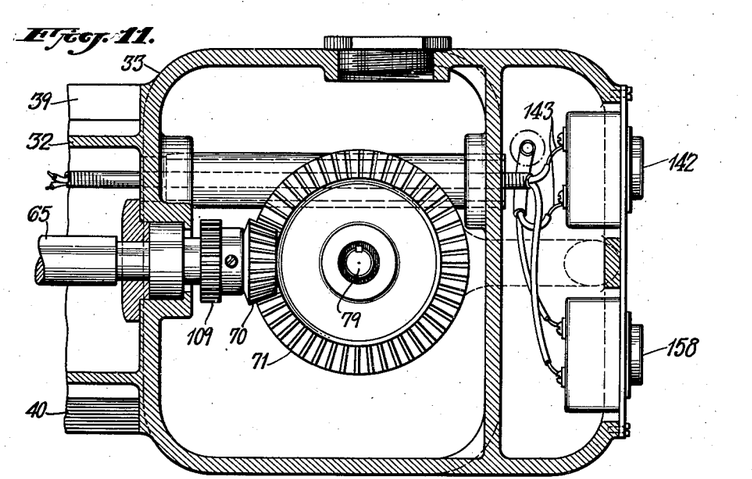
Figure 14:
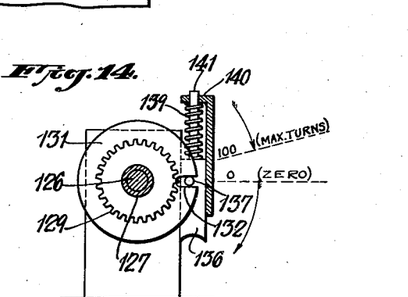
Fig. 14 is a cross-sectional view of part of the counting mechanism showing a switch-actuating element.
Figure 15:
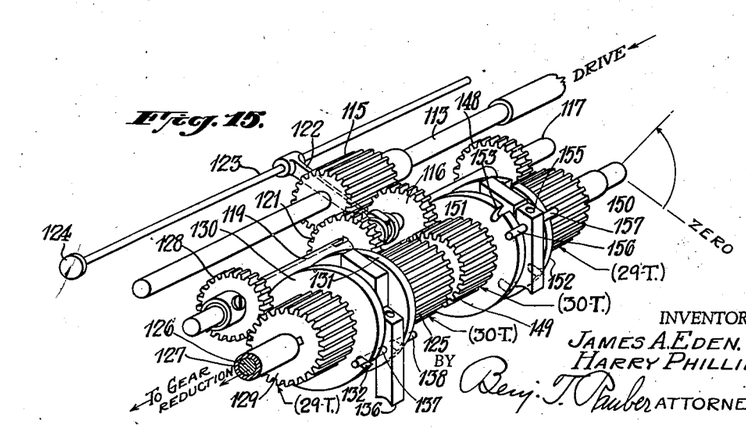
Fig. 15 is a perspective view of certain elements of the counting mechanism as it would appear from below with the parts developed to bring the line 13—13 of Fig. 12 in a single plane.

Between the two flanges 130 and 131 there is mounted a sliding reverse switch member 136, Figs. 10, 14 and 15, having a pin 137 extending on one side to rest against the periphery of the flange 130 or to enter the notch 132, and a pin 138 aligned with the pin 137 and extending on the opposite side to rest on the periphery of flange 131 or to enter the notch 133.

Assuming that the notches 132 and 133 are initially in alignment and the pins 137 and 138 are received therein and that the flanges are rotated counterclockwise as viewed in Fig. 14, it will be apparent that the switch member 136 will be pushed upwardly against the action of spring 139 confined between the switch member 136 and the stop 140 encircling the stem 141 of the switch member.

As the rotation of the flanges 130, 131 continues, the notches move further out of alignment and it is impossible for both pins 137, 138 to enter their respective notches at the same time and one of them is, therefore, always held against the periphery of the flange and the switch member 136 is held upwardly against the action of the spring 139. After rotating the gear 129 counter-clockwise the knob 124 will be released and the pinion 121 meshes with the drive pinion 115, the mechanism will be in position to start.

Figure 12:
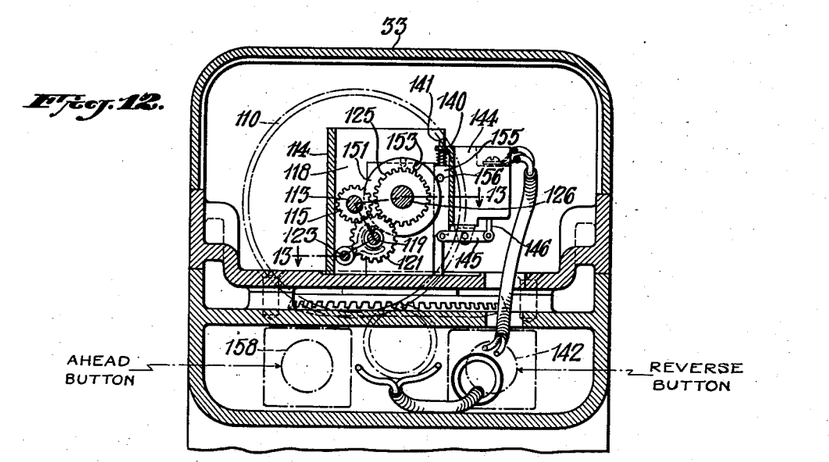
Fig. 12 is a vertical section through a counting mechanism for controlling the feed of the tap.
Figure 13:
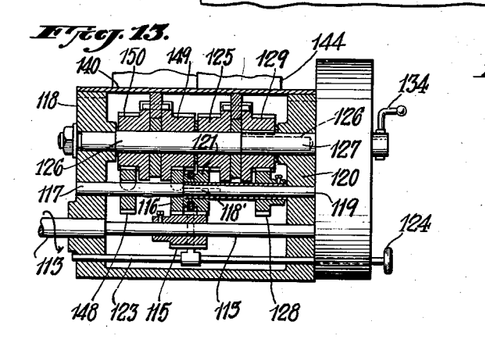
Fig. 13 is a horizontal section taken on the line 13—13 of Fig. 12.

The motor 61 is controlled from the spindle head by means of a starting switch button 142 connected through connecting wires 143 with a starting and reversing switch 144, Fig. 12. When the button 142 is pressed the switch 144 is moved to starting position and the motor 61 starts and continues to drive the shaft 65, the lead screw spindle 98 and the control drive shaft 113. This in turn rotates the pinion 121 and with it the pinions 125 and 129 in the opposite direction from that rotated by the crank 134 or in clockwise position, viewed in Fig. 14.

This rotation continues proportional to the rotation of the lead screw spindle 98 until the notches 132 and 133 move into alignment. When this occurs and they approach the respective pins 137 and 138, these pins drop into the notches and are carried forward by the rotation of the flanges and by the action of the spring 139 moving the switch member 136. This in turn acts through a lever 145, Fig. 12, to actuate a reversing rod 146. This reverses the switch 144 and with it the motor 61 and the spindle 98 to withdraw the tap.

It will be apparent, therefore, that the rotation of the spindle 98 may be controlled by the extent to which the shaft 127 is rotated by the crank arm 134. The number of rotations of the handle 134 is indicated by the dial 135.

Figure 1:
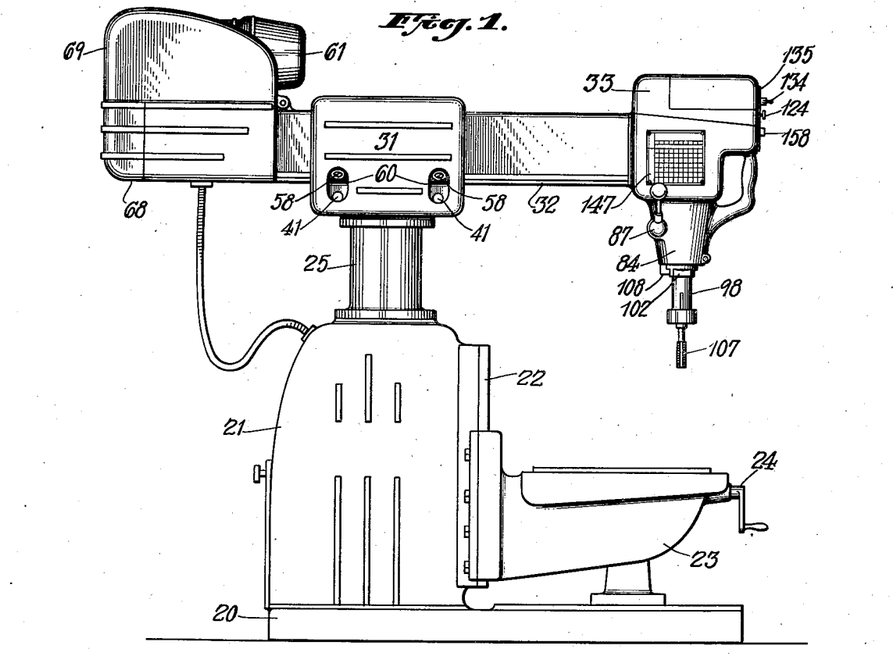
Fig. 1 is a side elevation of a lead screw tapping machine embodying a preferred form of the invention.
Figures 2, 3:
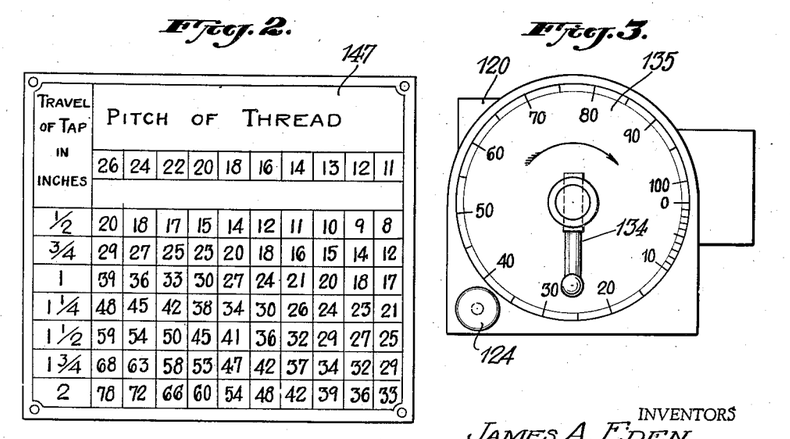
Fig. 2 is a chart illustrating a relationship between a thread and the travel of the tap and an example of the dial setting.
Fig. 3 is an end view of the counting mechanism.

A chart 147, Fig. 2, is provided at the side of the head 33 giving the number of turns of the dial corresponding to different pitches of thread and the depth of the tap. For example, for a one inch depth the range on the dial for pitches of 26 to 11 will be from 39 to 17. Also, for example, the range for a 26 pitch from one-half to two inches will be from 20 to 78. Intermediate depths may be interpolated between these limits.

It is necessary, however, that once the reversing switch has been started, that it shall stop when the counting mechanism has returned to its initial starting position. This may be accomplished by a gear mechanism similar to the gears or pinions 121, 125, 128, 129. For this purpose there is rigidly mounted on the shaft 117 a second gear 148, and correspondingly there is rotatably mounted on the shaft 126 a pinion 149 meshing with the pinion 116, and a pinion 150 meshing with the pinion 148. The teeth arrangement of these pinions is similar to that of the gear mechanism 121, 129, but reversely positioned, for example, the pinion 150 has 29 teeth and the pinion 149 has 30 teeth, where the pinion 125 has 30 teeth, and the pinion 129, 29 teeth.

The pinions 149 and 150 also are provided with oppositely facing flanges 151 and 152 provided respectively with notches 153 and 154. Contrary to the position of the notches 132 and 133, the notches 153 and 154 are in alignment at the starting position and are rotated during the rotation of the shaft 113 out of alignment so that when the notches 132 and 133 of flanges 130 and 131 come into alignment, the notches 153 and 154 have moved out of alignment a distance corresponding to that set on the dial 135.

A switch member 155 having projecting pins 156 and 157 is, therefore, held upwardly by the displaced position of the notches 153 and 154 being held by the peripheral edges of the flanges 151, 152, until the reverse rotation of the motor 61 brings the notches to aligned starting position, whereupon the switch member 155 will move downwardly to open the switch 144 and stop the rotation of the motor. The motor stops dead when its circuit is broken and, therefore, is brought to rest always at the same position.

A reversing switch button 158 is provided in the head 33 whereby the motor 61 may be reversed in an emergency before it reaches the limit set by the dial 135 and crank 134. It will be understood that the above mechanism is shown merely by way of example and to give a preferred example of a counting and control mechanism.

Through the above invention we have provided a mechanism whereby a tap may be held accurately in true position for inserting into a bore to be tapped, whereby the tap may be driven and lead into the bore at the pitch set by the tap and without imposing any force or reaction on the free end of the tap or spindle, permitting its end to float so that the tap follows freely into the threads formed by it and these threads are, therefore, formed without distortion and accurately to fit the threads of the tap. The screw thread thus formed will have exactly the accuracy and pitch of the tap itself.

The floating mounting of the tap spindle also enables the head to be swung freely to any position. The work piece may be clamped on the table 24, raised to the desired height, and any number of openings or bores may be tapped accurately in rapid succession.

It would be impossible to injure the work piece or to break the machinery even if the tap should not be accurately set on a bore opening, or should not be set on any opening at all, because pressure thus exerted would be relieved by yielding of the spring 104.

By means of the countercontrol and reversing switch, it is only necessary to set the apparatus for any desired depth, as shown by the chart of Fig. 2, and push the starting button and the mechanism will thereupon advance the tap into the bore or opening accurately to the predetermined depth and then withdraw it.

What we claim is:

1. Apparatus for tapping which comprises a driving head to rotate and advance a tap holding spindle, a tap holding spindle rotatably mounted in said head and rotatable on its axis relative to said head and means to support said head to move freely in a plane transversely of said spindle during the rotation of said spindle.

2. Apparatus for tapping which comprises a driving head to rotate a tap holding spindle, a tap holding spindle rotatably mounted in said head and rotatable on its axis relative to said head, means to advance said spindle at the same rate of pitch of the tap to be held by said spindle and means to support said head to move freely in a plane transverse to the axis of said spindle during the rotation of said spindle.

3. Apparatus for tapping which comprises a carriage rotatable on a vertical axis, pairs of rollers in said carriage on opposite sides of the pivotal axis of said carriage, a beam having surfaces engaged between the rollers of said pairs to hold said beam slidably in a fixed horizontal position relative to said carriage, a driving head on said beam to rotate and advance a tap holding spindle, a tap holding spindle extending downwardly from said head, a motor on said beam on the opposite side of said rollers from said head and transmission mechanism from said motor to said head.

4. Apparatus for tapping which comprises a carriage rotatable on a vertical axis and having pairs of rollers mounted on opposite sides of the axis of rotation of said carriage, a beam having surfaces engaged between said rollers to hold said beam slidably in fixed horizontal position relative to said carriage, a motor on said beam on one side of said carriage, a driving head on said beam on the opposite side of said carriage and in counterbalancing relation to said motor, a tap rotating and advancing means in said head and means driven by said motor to rotate said tap holding and rotating means.

5. Apparatus for tapping which comprises a carriage rotatable on a vertical axis, a beam mounted on said carriage and having a pair of horizontal flanges the upper edge of said flanges being bevelled, pairs of rollers in said carriage engaging said flanges on opposite sides of the axis of rotation of said carriage to hold said beam in fixed horizontal position and permit it to slide between said rollers, a driving head on a projecting end of said beam, a motor on said beam on the opposite side of said carriage, a tap rotating and advancing means in said head and means for driving said rotating and advancing means from said motor.

6. Apparatus for tapping which comprises a carriage rotatable on a vertical axis, a beam mounted on said carriage and having a pair of horizontal flanges the upper edges of said flanges being beveled, pairs of rollers in said carriage engaging said flanges on opposite sides of the axis of rotation of said carriage to hold said beam in fixed horizontal position and permit it to slide between said rollers, a driving head on a projecting end of said beam, a motor on said beam on the opposite side of said carriage, a tap rotating and advancing means in said head and means for driving said rotating and advancing means from said motor, said driving means comprising a shaft extending longitudinally of said beam and carried thereby and transmission means between said motor and said shaft and between said shaft and said tap rotating means.

7. Apparatus for tapping which comprises a carriage rotatable on a vertical axis, a beam mounted on said carriage and having a pair of horizontal flanges the upper edges of said flanges being bevelled, pairs of rollers in said carriage engaging said flanges on opposite sides of the axis of rotation of said carriage to hold said beam in fixed horizontal position and permit it to slide between said rollers, a driving head on a projecting end of said beam, a motor on said beam on the opposite side of said carriage, a tap rotating and advancing means in said head and means for rotating said tapping and advancing means from said motor, means for counting the rotations of said tap rotating means and means for reversing said motor after said counting means has reached a predetermined count.

8. Apparatus for tapping which comprises means for rotating and advancing a tap holding spindle, a counting mechanism driven by said rotating and advancing mechanism and comprising a pair of rotating elements differentially rotated towards alignment by said driving mechanism and manually rotatable in the opposite direction to a distance to correspond to the rotation and advance to be given to said spindle and means actuated by said counting means when said rotating elements are in alignment to stop said spindle rotating and advancing means.

9. Tapping mechanism which comprises means for rotating and advancing a spindle and for reversing said rotation and withdrawing said spindle, counting means comprising rotating mechanism positively geared to, and driven by, said spindle driving means toward a stopping position, manually operable means to move said counting means in the opposite direction from said stopping position to predetermine the rotation and advance of said spindle, means actuated by said counting means to reverse and withdraw said spindle and means in said counting means rotated reversely by said spindle rotating and advancing means to stop the reverse rotation of said spindle when said spindle reaches its starting position.

10. Tapping mechanism which comprises a tap holding and advancing spindle, a reversible motor having a starting and reversing switch mechanism, a transmission between said motor and said spindle, a counting means geared to and rotating to a stopping position in fixed relation to said spindle to move said switch mechanism to reversing position and manually operable means to rotate said counting means independently of said spindle to a position to predetermine the rotation and advance of said spindle to stopping position.

11. Tapping mechanism which comprises a tap holding and advancing spindle, a reversible motor having a starting and reversing switch mechanism, a transmission between said motor and said spindle to drive said spindle from said motor, a counting means geared to and rotating in fixed relation to said spindle, means operated by said counting means upon reaching a predetermined position to open said switch mechanism.

12. Tapping mechanism which comprises a tap holding and advancing spindle, a reversible motor having a starting and reversing switch mechanism, a transmission mechanism between said motor and said spindle, a counting mechanism positively driven from said transmission to drive a pair of rotating mechanisms at different speeds and means operated by said rotating mechanisms when rotated into alignment to open said switch mechanism.

13. Tapping mechanism which comprises a tap holding and advancing spindle, means for positively driving said spindle, counting mechanism comprising a pair of elements rotatable into aligned position to stop said spindle driving mechanism and a gearing driven from said spindle driving mechanism to rotate said elements at different speeds from a predetermined starting position to a position of alignment.

14. Tapping mechanism of claim 13, in which said rotatable elements may be manually rotated to a selected starting position.

15. Tapping mechanism which comprises a tap holding and advancing spindle, a reversible motor having a starting and reversing switch mechanism, a transmission between said motor and said spindle, a counting means positively driven in fixed relation to said spindle and driving means, a spindle control mechanism comprising two pairs of such control elements, one pair of which when brought into alignment reverses said switch mechanism and the other pair of which when brought into alignment opens said switch mechanism to stop said motor, and two pairs of gears, one pair for each of said switch control mechanisms, the gears of each pair rotating at different speeds to rotate said first pair of switch control elements into alignment and forward driving of said spindle, and to rotate the second of said switch control elements into alignment upon the reverse movement of said spindle and driving mechanism.

16. Tapping mechanism of claim 15 having means for disengaging one set of gears from the common driving means and rotating it manually to a selected position.

17. Tapping mechanism of claim 15 in which said rotatable switch control elements each comprises a pair of discs driven from their respective gears and having a pair of peripheral notches and a switch actuating plunger having pins to be received in said notches when said notches are rotated into alignment.

18. Tapping mechanism which comprises a supporting carriage rotatable about a vertical axis and having supporting rollers on opposite sides of said axis, a beam mounted between said rollers to slide in a horizontal direction on said carriage, a motor mounted on said beam on one side of said carriage, a reversing and stopping switch mechanism for said motor, a tapping head mounted on said beam on the opposite side of said carriage, a horizontal shaft extending lengthwise of said beam to drive said tapping head from said motor, a tap carrying spindle mounted vertically in said tapping head, gearing to drive said tap carrying spindle from said horizontal shaft, a control mechanism geared to said horizontal shaft and comprising two pairs of such actuating elements, the elements of one pair when brought into alignment reversing said switch mechanism of said motor, and the elements of the second pair opening said switch mechanism to stop said motor, and means in said control mechanism to drive said first pair toward alignment upon the forward driving of said spindle and to drive the elements of said second pair into alignment upon reverse rotation of said spindle.

19. Tapping mechanism which comprises means for rotating and advancing a spindle, counting means comprising rotating mechanism geared to and positively driven in fixed relation to the rotation of said spindle from a starting position to a stopping position and means controlled by said counting means to limit the rotation of said spindle between said starting and stopping positions.

20. Tapping mechanism which comprises means for rotating and advancing a spindle, counting means comprising rotating mechanism geared to and positively driven in fixed relation to the rotation of said spindle from a starting position to a stopping position, means controlled by said counting means to limit the rotation of said spindle between said starting and stopping positions and manual means to rotate said counting mechanism relative to said spindle to adjust the distance between said starting and stopping positions.

JAMES A. EDEN.
HARRY PHILLIPS.